US011603950B2

(12) United States Patent
Peters et al.

(10) Patent No.: US 11,603,950 B2
(45) Date of Patent: Mar. 14, 2023

(54) DEVELOPMENT OF FUSEAL MECHANICAL JOINT (71) Applicant: GEORG FISCHER HARVEL LLC, Little Rock, AR (US)

(72) Inventors: Nicholas Peters, Benton, AR (US); Amy Liang, Shanghai (CN); Jack Lei, Shanghai (CN); Thomas Sixsmith, Lake Forest, CA (US); Mansoor Akhthar Basheer, Little Rock, AR (US); Jürgen Stumpp, Rafz (CH); Jason Liu, Shanghai (CN)

(73) Assignee: Georg Fischer Harvel LLC, Little Rock, AR (US)

( * ) Notice: Subject to any disclaimer, the term of this patent is extended or adjusted under 35 U.S.C. 154(b) by 172 days.

(21) Appl. No.: 16/755,187

(22) PCT Filed: Oct. 12, 2017

(86) PCT No.: PCT/CN2017/105891
§ 371 (c)(1),
(2) Date: Apr. 10, 2020

(87) PCT Pub. No.: WO2019/071532
PCT Pub. Date: Apr. 18, 2019

(65) Prior Publication Data
US 2021/0190244 A1 Jun. 24, 2021

(51) Int. Cl.
*F16L 21/06* (2006.01)
*F16L 21/03* (2006.01)
(52) U.S. Cl.
CPC ............. *F16L 21/03* (2013.01); *F16L 21/065* (2013.01)

(58) Field of Classification Search
CPC ......... F16L 17/02; F16L 17/06; F16L 21/007; F16L 21/02; F16L 21/03; F16L 21/06;
(Continued)

(56) References Cited

U.S. PATENT DOCUMENTS 4,027,904 A 6/1977 Bram
4,298,222 A 11/1981 Davies
(Continued)

FOREIGN PATENT DOCUMENTS

CN 2556452 Y 6/2003
CN 101266001 A 9/2008
(Continued)

OTHER PUBLICATIONS

International Search Report and Written Opinion of the ISA issued in PCT/CN2017/105891, dated Jul. 6, 2018; ISA/CN.

*Primary Examiner* — Aaron M Dunwoody
(74) *Attorney, Agent, or Firm* — Harness, Dickey & Pierce, P.L.C.

(57) ABSTRACT

A pipe (12) coupling assembly (16, 116) includes a body (64, 120), a rib (65, 122), and teeth (56, 124). The body (64, 118) has an outer diameter and first and second inner diameter sections (68, 128, 70, 130). The first inner diameter section (68, 128) is wider than the second inner diameter section (70, 130). The rib (65, 122) extends around the first diameter section (68, 128) and projects radially inwardly therefrom. The teeth (56, 124) are situated within the second inner diameter section (70, 130) and project radially inwardly toward a central axis (38, 134) of the body (64, 120).

18 Claims, 9 Drawing Sheets (58) Field of Classification Search
CPC ... F16L 21/065; F16L 37/091; F16L 37/0925;
F16L 37/0927; F16L 47/06; F16L 47/08;
F16L 47/10; F16L 47/12
USPC ........ 285/113, 108, 337, 339, 348, 374, 400
See application file for complete search history.

(56) References Cited

U.S. PATENT DOCUMENTS

| | | | | |
|---|---|---|---|---|
| 4,807,912 | A * | 2/1989 | Maier | F16L 33/23 |
| | | | | 285/348 |
| 5,390,965 | A * | 2/1995 | Few | F16L 21/08 |
| | | | | 285/342 |
| 6,851,728 | B2 * | 2/2005 | Minami | F16L 47/04 |
| | | | | 285/342 |
| 7,571,940 | B2 * | 8/2009 | Krausz | F16L 21/065 |
| | | | | 285/421 |

FOREIGN PATENT DOCUMENTS

| | | |
|---|---|---|
| CN | 204829008 U | 12/2015 |
| CN | 106322014 A | 1/2017 |
| CN | 106931255 A | 7/2017 |
| JP | H06185677 A | 7/1994 |
| KR | 100959302 B1 | 5/2010 |

\* cited by examiner

DEVELOPMENT OF FUSEAL MECHANICAL JOINT

CROSS-REFERENCE TO RELATED APPLICATIONS

This application is a 371 U.S. National Phase of International Application No. PCT/CN2017/105891, filed Oct. 12, 2017. The entire disclosure of the above application is incorporated herein by reference.

FIELD

The present disclosure relates to a development of fuseal mechanical joint.

BACKGROUND

This section provides background information related to the present disclosure which is not necessarily prior art.

Coupling devices allow multiple pipes to be connected to each other for various piping applications. These coupling devices have various drawbacks such as requiring special tooling to operate, are time consuming to install, and the lack of re-usability. The teachings of the present disclosure provide a coupling that is simple to install, is cost effective, and is re-usable.

SUMMARY

This section provides a general summary of the disclosure, and is not a comprehensive disclosure of its full scope or all of its features.

In one form, a coupling assembly includes an annular body, a rib, and teeth. The annular body has an outer diameter section and first and second inner diameter sections. The first inner diameter section is wider than the second inner diameter section. The rib extends around the first inner diameter section and projects radially inwardly therefrom. The teeth are situated within the second inner diameter section and project radially inwardly toward a central axis.

In some configurations, the annular body includes a third inner diameter section. The third inner diameter section is wider than the second inner diameter section and smaller than the first inner diameter section.

In some configurations, the third inner diameter section is disposed between the first inner diameter section and the second inner diameter section.

In some configurations, the coupling assembly includes a sealing member. The sealing member includes a body and a lip. The lip of the sealing member extends outwardly from the body and is received in the third inner diameter section of the body.

In some configurations, the teeth are integrally formed to a surface of the second inner diameter section.

In some configurations, the teeth are integrally formed to a gripping ring.

In some configurations, the gripping ring is disposed within the second inner diameter section.

In some configurations, the annular body includes a locking mechanism that is integrally formed to the outer surface thereof.

In some configurations, a fastener is configured to actuate the locking mechanism from an unlocked state to a locked state to clamp the annular body around a pipe.

In some configurations, the rib extends around the first inner diameter section of the annular body and is received into a groove of a fitting.

In another form, a pipe assembly includes a fitting, a pipe, and a coupling assembly. The fitting defines an opening and has a groove extending around an end thereof. The pipe is received within the opening of the fitting. The coupling assembly is disposed on the fitting and the pipe. The coupling assembly includes an annular body, a rib, and teeth. The annular body has first and second inner diameter sections. The rib extends around the first inner diameter section and projects radially inwardly into the groove extending around the fitting. The teeth are situated within the second inner diameter section and projects radially inwardly to bite into the pipe.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
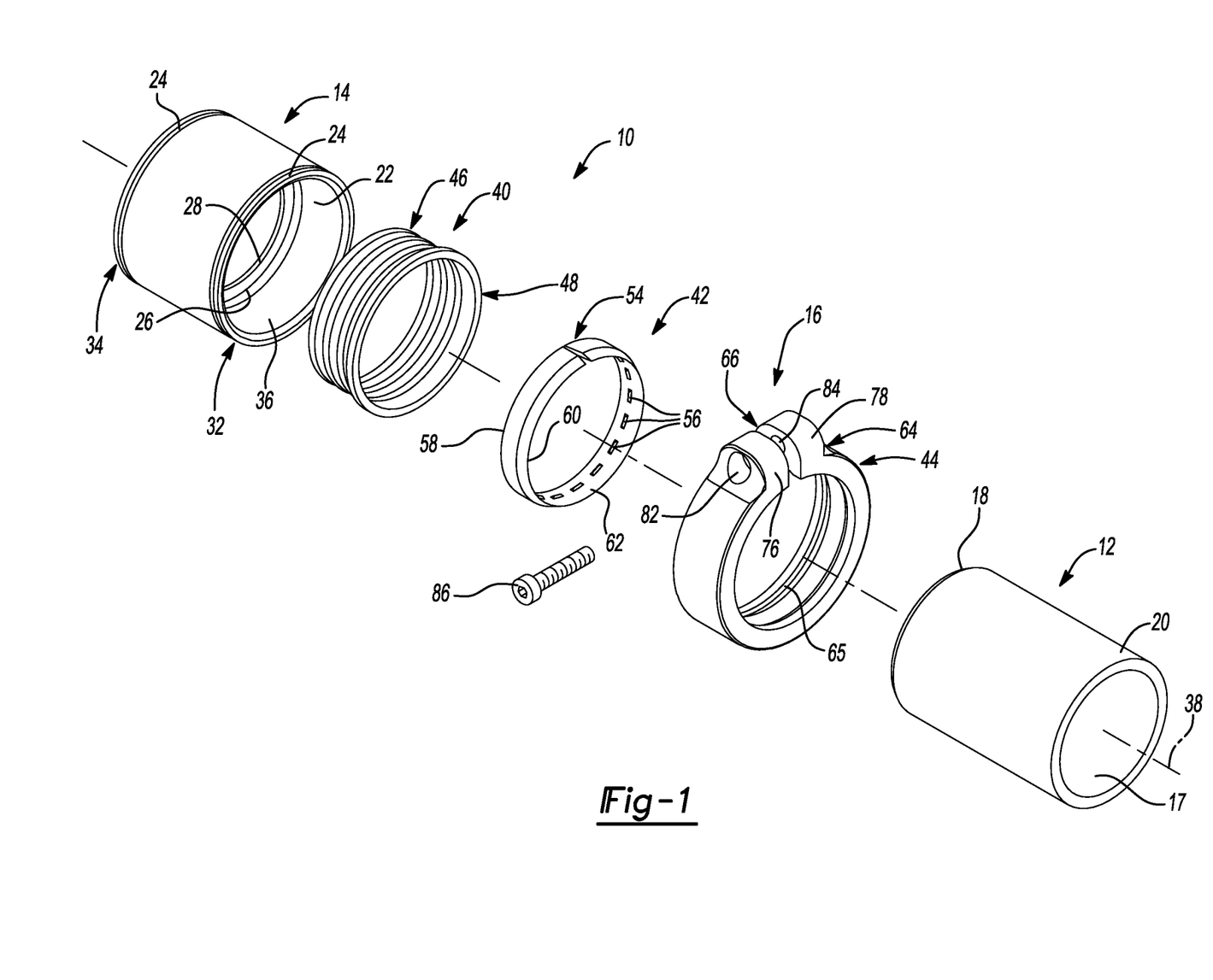
FIG. 1 is an exploded view of a pipe assembly according to the principles of the present disclosure.
Figure 2:
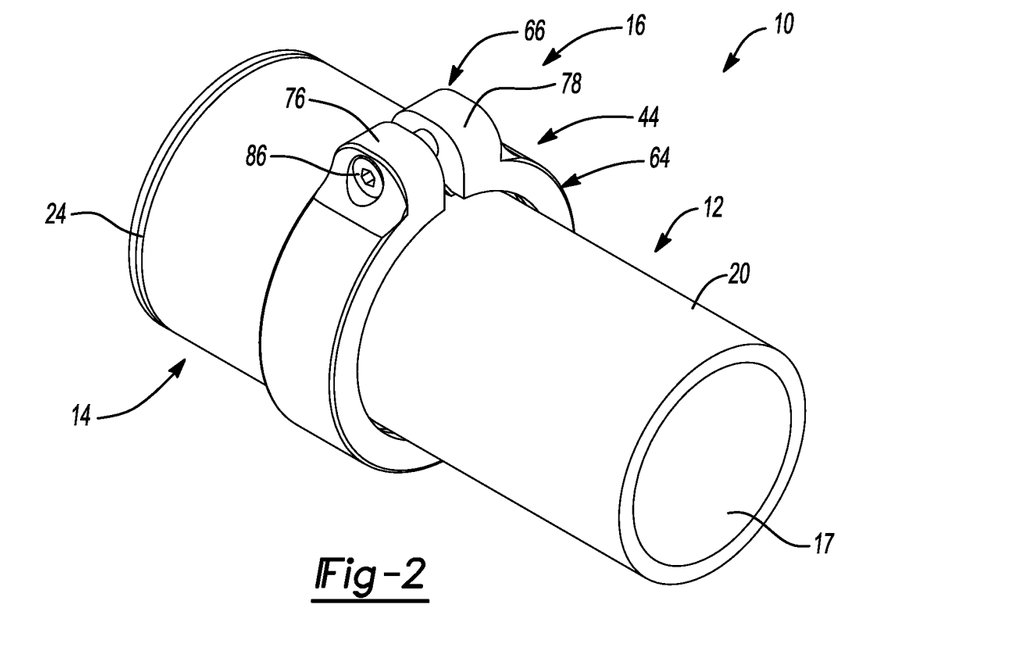
FIG. 2 is an assembled view of the pipe assembly shown in FIG. 1 with a coupling assembly in an unlocked state.
Figure 3:
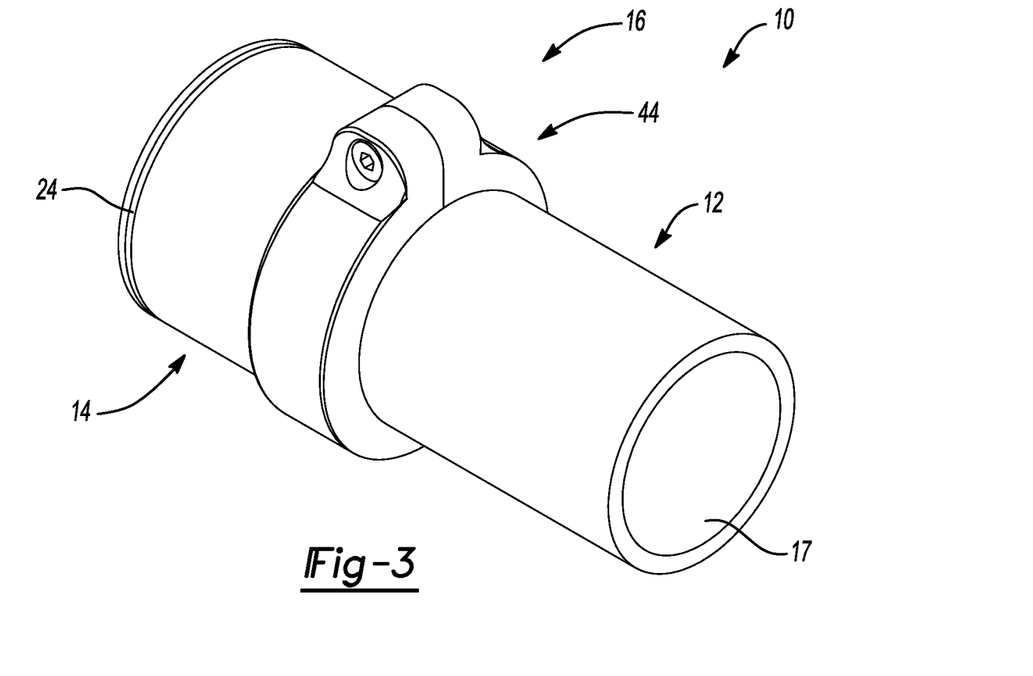
FIG. 3 is an assembled view of the pipe assembly shown in FIG. 1 with the coupling assembly in a locked state.

As shown in FIGS. 1-3, a pipe assembly 10 is provided. The pipe assembly 10 incudes a pipe 12, a fitting 14, and a coupling assembly 16. The pipe 12 is securely and sealingly coupled to the fitting 14 via the coupling assembly 16. The pipe 12 is tubular-shaped and may be made out of a polyvinylchloride (PVC), chlorinated polyvinylchloride (CPVC), acrylonitrile butadiene styrene (ABS), polypropylene (PP), polyvinyl difluoride (PVDF) or polyethylene (PE) material, for example. The pipe 12 may be formed from an extrusion process, for example, and define an opening 17 for fluid to flow through. The pipe 12 also includes first and second ends 18, 20 (FIG. 1).

With continued reference to FIGS. 1-3, the fitting 14 may be tubular-shaped and may be made out of a polyvinylchloride (PVC), chlorinated polyvinylchloride (CPVC), acrylonitrile butadiene styrene (ABS), polypropylene (PP), polyvinyl difluoride (PVDF) or polyethylene (PE) material, for example. In some configurations, the fitting 14 may be elbow shaped (e.g., 90°, 45°, etc.) or a Y-shaped flange, for example. The fitting 14 has an inner diameter that is wider than the diameter of the pipe 12 such that a portion of the pipe 12 may be received therein (FIGS. 2 and 3). The fitting 14 may be formed from an injection molded process, for example, and define an opening 22 (FIG. 1) for fluid to flow through. The fitting 14 also includes a pair of grooves 24 and first and second seats 26, 28 (FIG. 1). In some configurations, there may be more than a pair of grooves depending on the fitting used. Each groove 24 extends 360 degrees around an outer body of the fitting 14 at respective ends 32, 34 thereof. The first seat 26 projects radially inward from an inner surface 36 of the fitting 14 toward a central axis 38 (FIG. 1). The second seat 28 also projects radially inward from the inner surface 36 of the fitting 14 toward the central axis 38 (FIG. 1) at a distance greater than the first seat 26.

Figure 4:
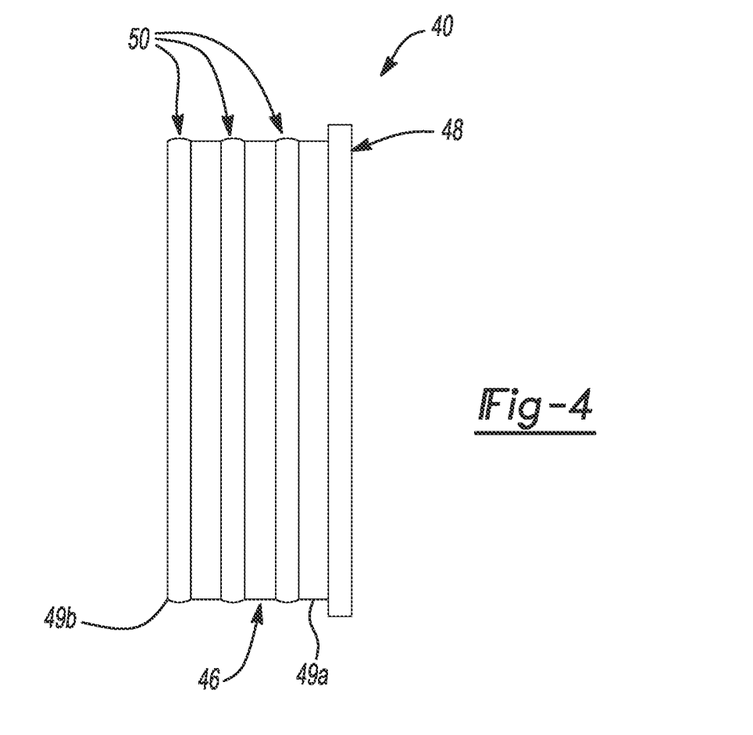
FIG. 4 is side view of a sealing member of the coupling assembly shown in FIG. 1.

With continued reference to FIGS. 1-3, and additional reference to FIGS. 4-8, the coupling assembly 16 includes a sealing member 40 (FIGS. 1 and 4), a gripping ring 42 (FIGS. 1, 5, and 6), and a hub 44 (FIGS. 1-3, 7 and 8). The tubular-shaped sealing member 40 may be made out of natural or artificial rubber, or elastomer material. As shown in FIGS. 1 and 4, the sealing member 40 includes a body 46 and a lip 48. The body 46 of the sealing member 40 has first and second ends 49a, 49b and includes ridges 50. The lip 48 extends outwardly from the first end 49a of the body 46 as best shown in FIG. 4.

Figure 5:
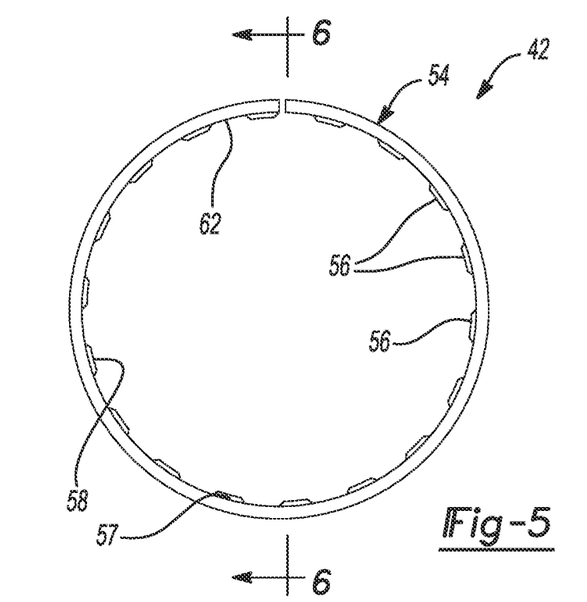
FIG. 5 is a front view of a gripping ring of the coupling assembly.
Figure 6:
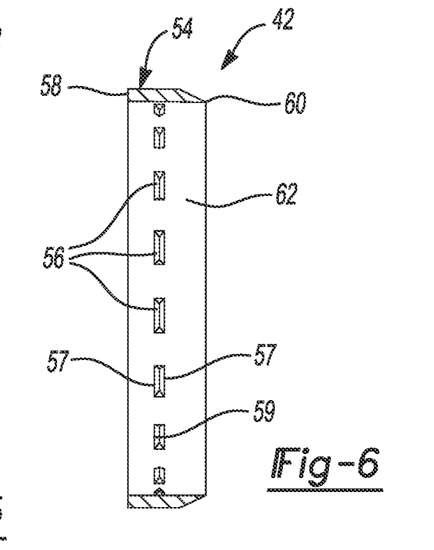
FIG. 6 is a cross-sectional view of the gripping ring of the coupling assembly taken along line 6-6 of FIG. 5.
Figure 7:
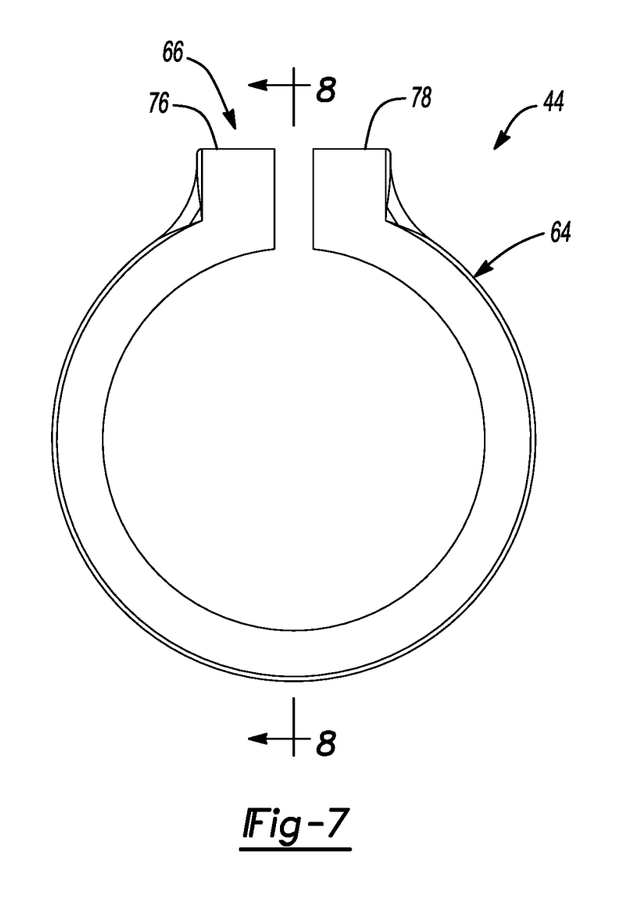
FIG. 7 is a front view of a hub of the coupling assembly.

As shown in FIGS. 1, 5 and 6, the gripping ring 42 includes a body 54 and teeth 56. The body 54 includes a first end 58 and a second end 60. The first end 58 has a flat end surface whereas the second end 60 may have a tapered surface. The teeth 56 are integrally formed to an inner surface 62 of the body 54 of the gripping ring 42 and project radially inwardly toward the central axis 38. The teeth 56 include a pair of angled surfaces 57 projecting radially inward toward one another forming an edge 59 for engaging the pipe 12.

Figure 8:
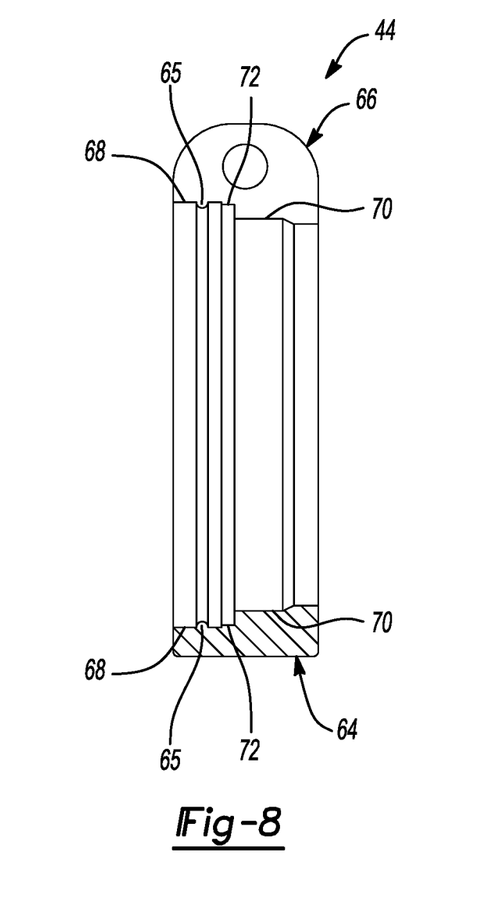
FIG. 8 is a cross-sectional view of the hub of the coupling assembly taken along line 8-8 of FIG. 7.

The hub 44 may be made out of a metallic or non-metallic material, for example, and may be formed by a molding process. The hub 44 includes an annular body 64, a rib 65 (FIGS. 1 and 8) and a locking mechanism 66. As shown in FIG. 8, the annular body 64 defines first, second, and third inner diameter sections 68, 70, 72. The first inner diameter section 68 is wider than the second and third inner diameter sections 70, 72. The third inner diameter section 72 is wider than the second inner diameter section 70 and disposed between the first inner diameter section 68 and the second inner diameter section 70.

The rib 65 extends 360 degrees around the first inner diameter section 68 and projects radially inwardly therefrom toward the central axis 38. In some configurations, the rib 65 may be segmented based on the manufacturability of the hub 44. The locking mechanism 66 is integrally formed to an outer surface of the annular body 64 and is actuated between an unlocked state (FIG. 2) and a locked state (FIG. 3). The locking mechanism 66 includes first and second locking tabs 76, 78. The locking tab 76 includes an aperture 82 therein that is aligned with an aperture 84 of the locking tab 78. A fastener 86 extends through the apertures 82, 84 of the locking tabs 76, 78, respectively, such that tightening the fastener 86 actuates the locking mechanism 66 from the unlocked state to the locked state.

Figure 9:
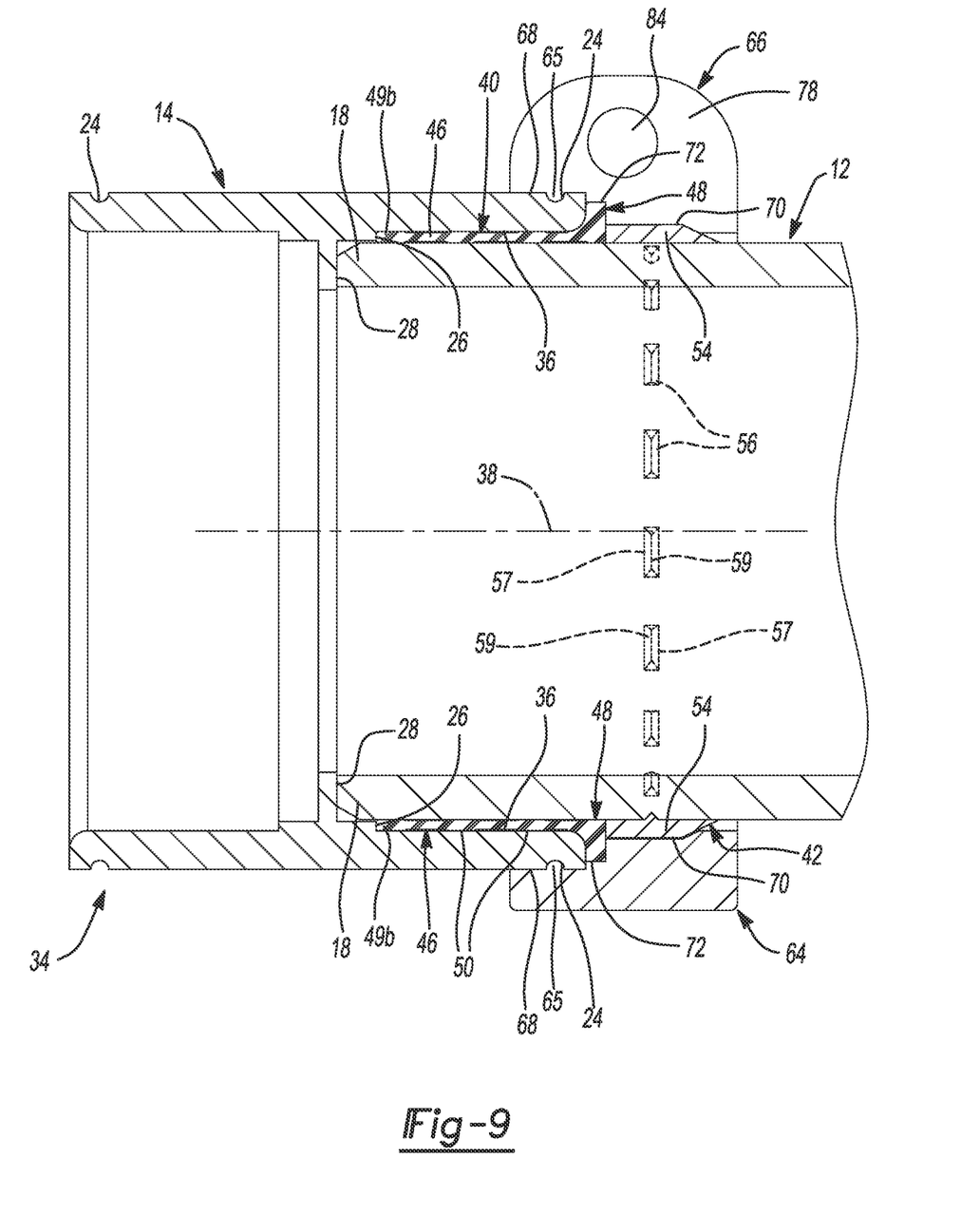
FIG. 9 is a cross-sectional view of the assembled pipe assembly with the coupling assembly in the locked state.
Figure 10:
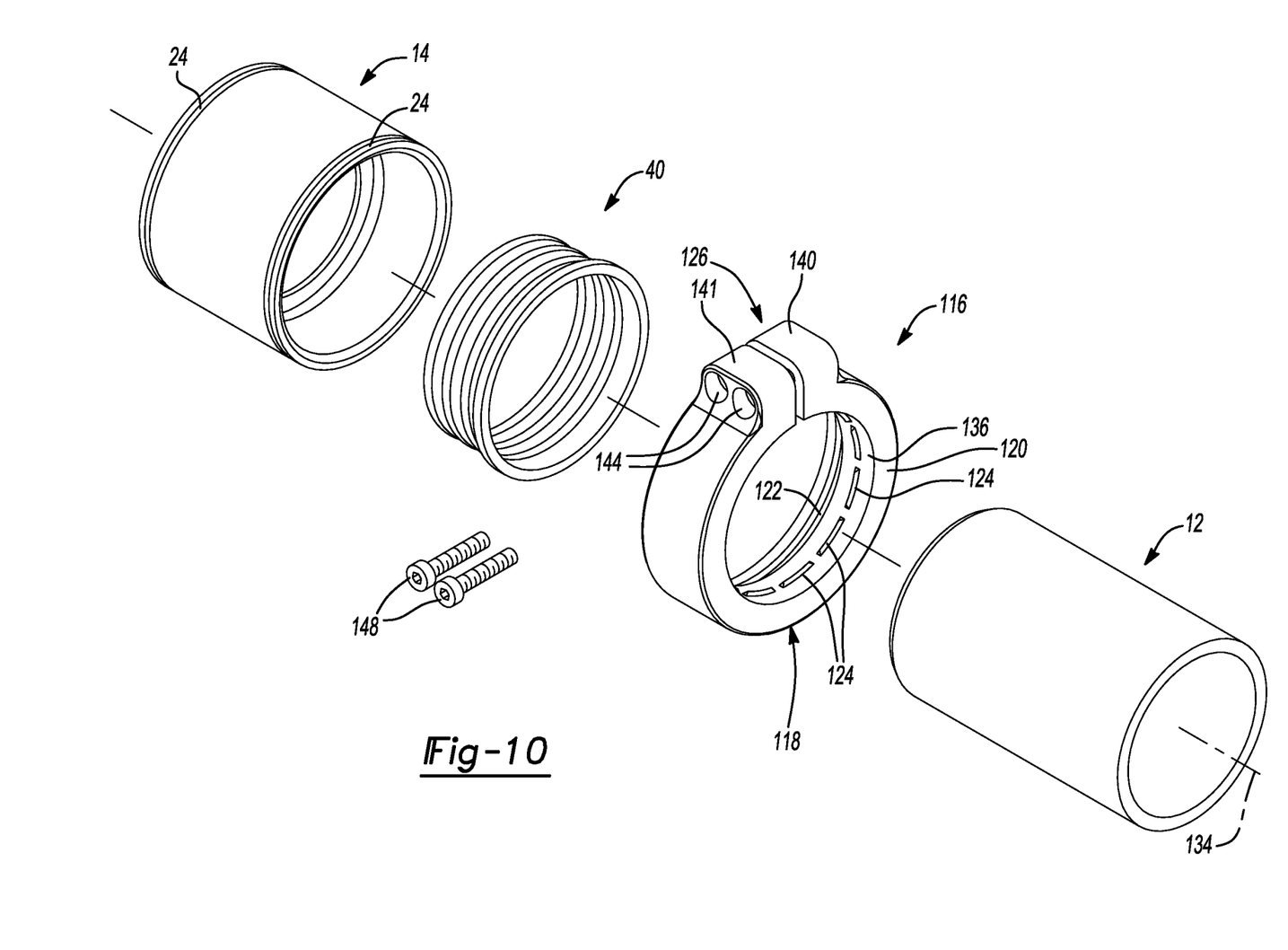
FIG. 10 is an exploded view of an alternate pipe assembly.
Figure 11:
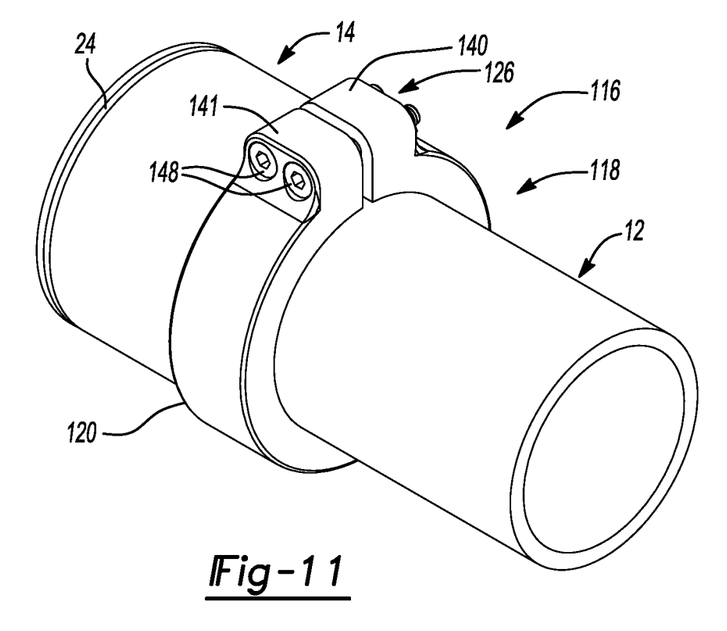
FIG. 11 is an assembled view of the alternate pipe assembly shown in FIG. 10 with a coupling assembly in an unlocked state.

With continued reference to FIGS. 1-9, assembly of the pipe assembly 10 will be described in detail. As shown in FIG. 9, the sealing member 40 is inserted into the end 34 of the fitting 14 such that the second end 49b is seated on the first seat 26 of the fitting 14. The first end 18 of the pipe 12 is inserted into the opening 22 of the fitting 14 such that the first end 18 abuts the second seat 28 of the fitting 14. In this way, the sealing member 40 is sandwiched between the fitting 14 and the pipe 12 and the ridges 50 prevent fluids flowing therethrough from escaping or leaking out.

Prior to the coupling assembly 16 being slid over the pipe 12 and the fitting 14, the gripping ring 42 is disposed within the second inner diameter section 70 of the annular body 64 of the hub 44 such that the teeth 56 are situated within the second inner diameter section 70 thereof. The hub 44 is then slid over the pipe 12 and fitting 14 such that the rib 65 is received in the groove 24 of the fitting 14 and the lip 48 of the sealing member 40 is received in the third inner diameter section 72 of the annular body 64 of the hub 44.

The fastener 86 is extended through the apertures 82, 84 of the locking tabs 76, 78, respectively, and tightened such that the locking mechanism 66 is actuated from the unlocked state (FIG. 2) to the locked state (FIG. 3). In this way, the hub 44 is clamped around the pipe 12 and the fitting 14, and the teeth 56 integrally formed to the inner surface 62 of the body 54 of the gripping ring 42 bite into an outer surface of the pipe 12. This secures the pipe 12 and the fitting 14 together while preventing axial pull out of the pipe 12.

It should be understood that another pipe (not shown) may be inserted through the end 34 of the fitting 14 and coupled thereto using another coupling assembly (not shown) in the same or similar manner as the coupling assembly 16 described above. That is, the coupling assembly 16 disclosed herein may securely and sealingly coupled multiple pipes together based on the specific application. The coupling assembly 16 of the pipe assembly 12 described above is simple to install and permits the user to re-use the coupling assembly 16 as necessary.

With reference to FIGS. 10-15, another coupling assembly 116 is provided that can be incorporated into the pipe assembly 10 instead of the coupling assembly 16. The structure and function of the coupling assembly 116 may be similar or identical to that of the coupling assembly 16, apart from any exception described below.

Figure 14:
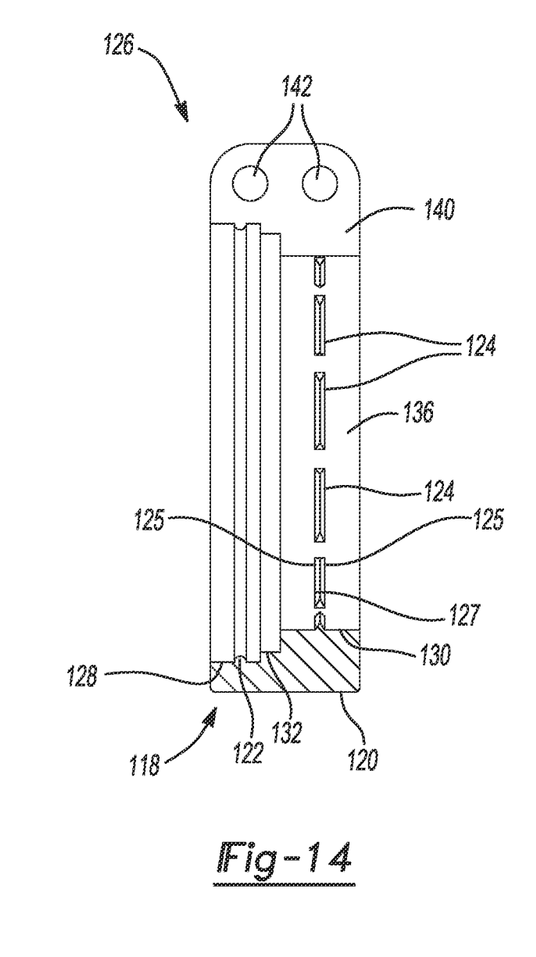
FIG. 14 is a cross-sectional view of the hub of the coupling assembly taken along line 14-14 of FIG. 13.

The coupling assembly 116 includes the sealing member 40 and a hub 118. The hub 118 may be made out of a metallic or non-metallic material, for example, and may be formed by a molding process. The hub 118 includes an annular body 120, a rib 122 (FIGS. 10, 14, and 15), teeth 124, and a locking mechanism 126. As shown in FIG. 14, the annular body 120 defines first, second, and third inner diameter sections 128, 130, 132. The first inner diameter section 128 is wider than the second and third inner diameter sections 130, 132. The third inner diameter section 132 is wider than the second inner diameter section 130 and disposed between the first inner diameter section 128 and the second inner diameter section 130.

Figure 12:
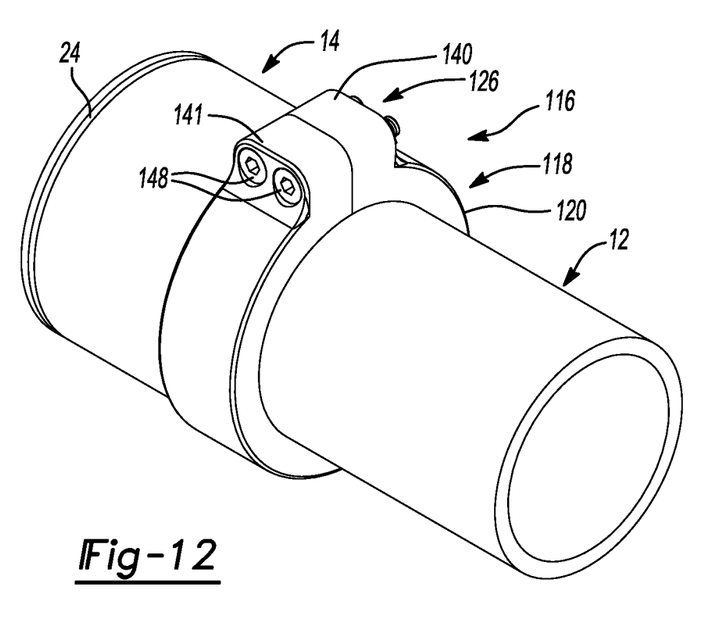
FIG. 12 is an assembled view of the alternate pipe assembly shown in FIG. 10 with the coupling assembly in a locked state.
Figure 13:
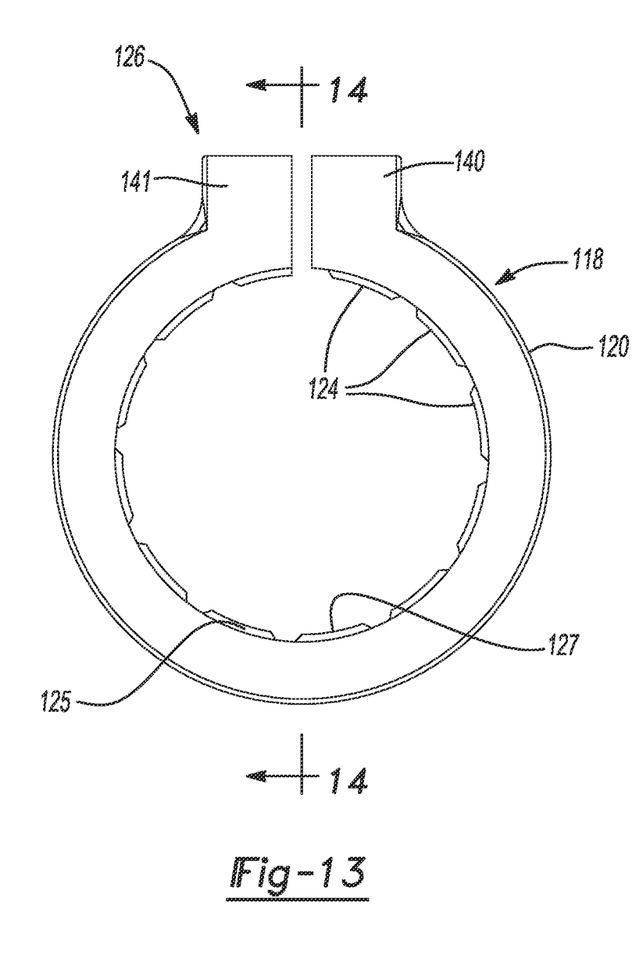
FIG. 13 is a front view of a hub of the coupling assembly.

The rib 122 extends 360 degrees around the first inner diameter section 128 and projects radially inwardly therefrom toward a central axis 134. The teeth 124 are integrally formed to a surface 136 of the second inner diameter section 130 and project radially inwardly toward the central axis 134. The teeth 124 include a pair of angled surfaces 125 projecting radially inward toward one another forming an edge 127 for engaging the pipe 12. The locking mechanism 126 is integrally formed to an outer surface of the annular body 120 and is actuated between an unlocked state (FIG. 11) and a locked state (FIG. 12). The locking mechanism 126 includes first and second locking tabs 140, 141. The locking tab 140 includes a pair of apertures 142 therein that are aligned with a pair of apertures 144 of the locking tab 141.

Figure 15:
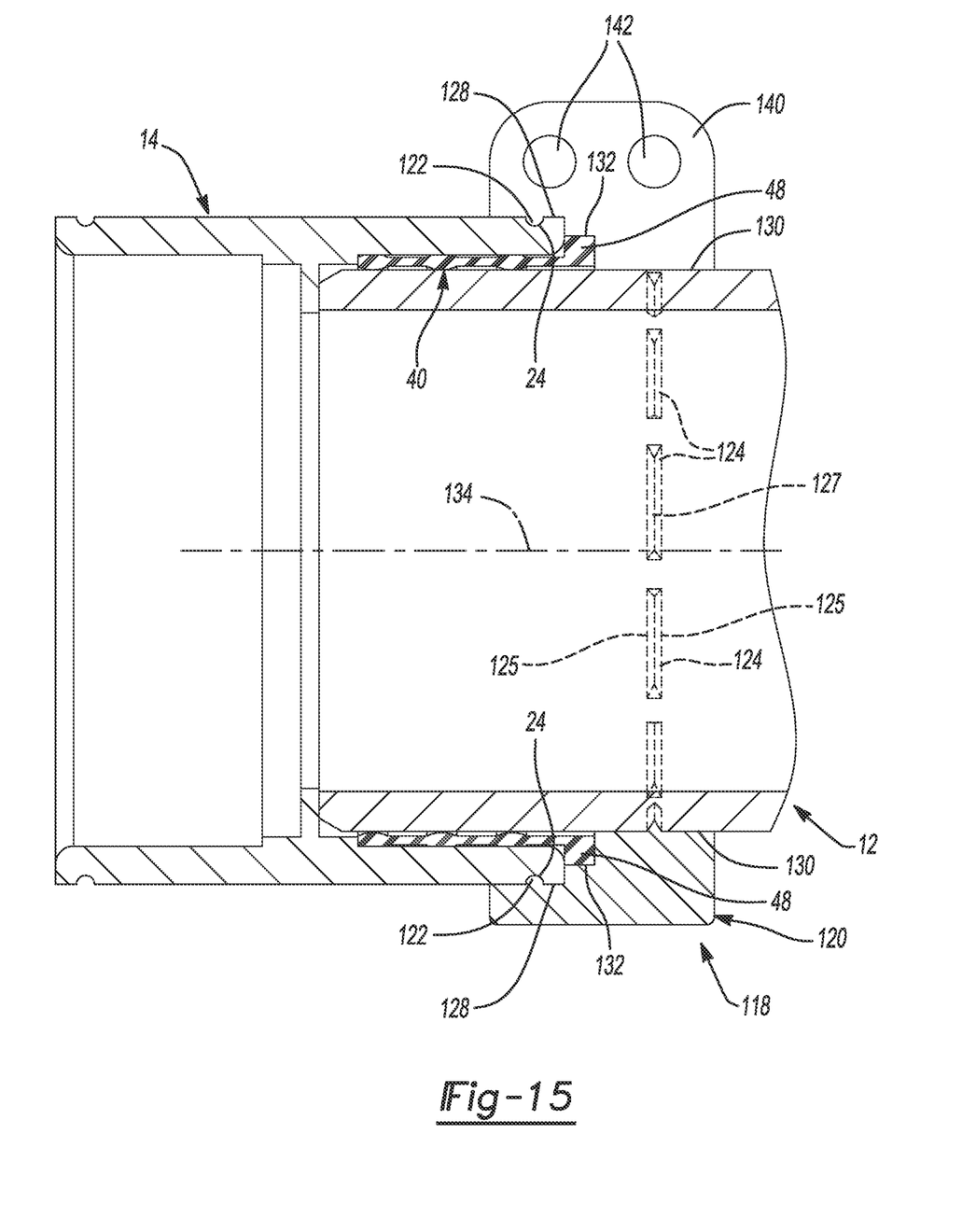
FIG. 15 is a cross-sectional view of the assembled alternate pipe assembly with the coupling assembly in the locked state.

As shown in FIG. 15, the hub 118 is disposed over the pipe 12 and the fitting 14 such that the rib 122 is received in the groove 24 of the fitting 14 and the lip 48 of the sealing member 40 is received in the third inner diameter section 132 of the annular body 120 of the hub 118.

Fasteners 148 extend through apertures 142 of the locking tab 140 and corresponding apertures 144 of the locking tab 141, respectively, such that tightening the fasteners 148 actuates the locking mechanism 126 from the unlocked state (FIG. 11) to the locked state (FIG. 12). In this way, the hub 118 is clamped around the pipe 12 and the fitting 14, and the teeth 124 integrally formed to the surface 136 of the second inner diameter section 130 bite into the outer surface of the pipe 12. This secures the pipe 12 and the fitting 14 together while preventing axial pull out of the pipe 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pipe coupling assembly comprising:
    an annular body having an outer surface and first and second inner diameter sections, the first inner diameter section being wider than the second inner diameter section;
    a rib extending around the first inner diameter section of the annular body and projecting radially inwardly therefrom;
    a plurality of teeth situated within the second inner diameter section such that the plurality of teeth are spaced circumferential with respect to one another and the plurality of teeth each include a first pair of angled surfaces projecting radially inwardly toward one another forming an edge for engaging a pipe and a second pair of angled surfaces projecting radially inward toward one another each at an end of the edge defining the edge between the second pair of angled surfaces and the plurality of teeth projecting radially inwardly toward a central axis;

a fitting having a seat configured to engage end portion of the pipe;

the fitting further having a radially outwardly facing groove; and the annular body being configured to slide over the pipe to the extent that the rib in the annular body seats in the groove in the fitting.

2. The coupling assembly of claim 1, wherein the annular body includes a third inner diameter section, and wherein the third inner diameter section is wider than the second inner diameter section and smaller than the first inner diameter section.

3. The coupling assembly of claim 2, wherein the third inner diameter section is disposed between the first inner diameter section and the second inner diameter section.

4. The coupling assembly of claim 3, further comprising a sealing member including a body and a lip, and wherein the lip of the sealing member extends outwardly from the body and is received in the third inner diameter section of the body.

5. The coupling assembly of claim 1, wherein the teeth are integrally formed to a surface of the second inner diameter section.

6. The coupling assembly of claim 1, wherein the teeth are integrally formed to a gripping ring.

7. The coupling assembly of claim 6, wherein the gripping ring is disposed within the second inner diameter section.

8. The coupling assembly of claim 1, wherein the annular body includes a locking mechanism integrally formed to the outer surface thereof.

9. The coupling assembly of claim 8, wherein a fastener is configured to actuate the locking mechanism from an unlocked state to a locked state to clamp the annular body around a pipe.

10. The coupling assembly of claim 1, wherein the rib extending around the first inner diameter section of the annular body is received into a groove formed in a fitting.

11. A pipe assembly comprising:

a fitting defining an opening and having a radially outwardly facing groove extending around an end thereof, the fitting having a seat being configured to receive an end of a pipe;

a coupling assembly disposed on the fitting and the pipe, the coupling assembling including an annular body, a rib, and teeth, the annular body having first and second inner diameter sections, the rib extending around the first inner diameter section and projecting radially inwardly, the teeth being situated within the second inner diameter section and the teeth each include a first pair of angled surfaces projecting radially inwardly toward one another to form an edge for engaging a pipe and the teeth include a second pair of angled surfaces projecting radially inward toward one another each at an end of the edge defining the edge between the second pair of angled surfaces, the teeth projecting radially inwardly to bite into the pipe; and the annular body being configured to slide over the pipe to the extent that the rib in the annular body engages the groove in the fitting.

12. The pipe assembly of claim 11, wherein the annular body includes a third inner diameter section, and wherein the third inner diameter section is wider than the second inner diameter section and smaller than the first inner diameter section.

13. The pipe assembly of claim 12, further comprising a sealing member including a body and a lip, and wherein the sealing member is sandwiched between the fitting and the pipe such that the lip is received within the third inner diameter section.

14. The pipe assembly of claim 13, wherein the teeth are integrally formed to an inner diameter surface of the annular body.

15. The pipe assembly of claim 13, wherein the teeth are integrally formed to a gripping ring.

16. A pipe assembly comprising:

a fitting defining an opening and having a radially outwardly facing groove extending around an end thereof, the fitting having a circumferential seat being configured to receive an outer circumferential end of a pipe;

the fitting further including a radially inwardly extending seat configured to engage an end of the pipe;

a coupling assembly disposed on the fitting and the pipe, the coupling assembling including an annular body, a rib, the annular body having first and second inner diameter sections, the rib extending around the first inner diameter section and projecting radially inwardly, a series of teeth integrally formed as one piece with the second inner diameter section of the annular body and the teeth each include a pair of angled surfaces projecting radially inwardly toward one another to form an edge to bite into the pipe;

the annular body being configured to slide over the pipe to the extent that the rib in the annular body seats in the groove in the fitting; and the fitting and pipe are sealed with a sealing member including a body and a lip, and wherein the sealing member is sandwiched between the fitting and the pipe.

17. The pipe assembly of claim 16 wherein an inner circumferential wall of the fitting adjacent the seat being sealed to an outer circumferential wall of the pipe.

18. A pipe coupling assembly comprising:

an annular body having an outer surface and first and second inner diameter sections, the first inner diameter section being wider than the second inner diameter section;

a rib extending around the first inner diameter section of the annular body and projecting radially inwardly therefrom;

a plurality of teeth situated within the second inner diameter section such that the plurality of teeth are spaced circumferential with respect to one another along a single circumferential line and the plurality of teeth each include a first pair of angled surfaces projecting radially inwardly toward one another forming an edge for engaging a pipe and a second pair of angled surfaces projecting radially inward toward one another each at an end of the edge defining the edge between the second pair of angled surfaces and the plurality of teeth projecting radially inwardly toward a central axis;

a fitting having a seat configured to engage end portion of the pipe;

the fitting further having a radially outwardly facing groove; and the annular body being configured to slide over the pipe to the extent that the rib in the annular body seats in the groove in the fitting.

* * * * *